United States Patent [19]
Maruyama et al.

[11] Patent Number: 5,706,422
[45] Date of Patent: Jan. 6, 1998

[54] METHOD OF LOCATING FAULT OF COMMUNICATION SYSTEM

[75] Inventors: Hisayuki Maruyama, Ebina; Jushi Ide, Mito; Seiichi Yasumoto, Hitachi; Sadao Mizokawa, Katsuta; Ken Onuki; Toshio Ishihara, both of Hitachi; Masato Satake, Ibaraki-ken; Toshihiko Uchiyama, Hitachi, all of Japan

[73] Assignees: Hitachi Ltd., Tokyo; Hitachi Process Computer Engineering, Inc., Hitachi, both of Japan

[21] Appl. No.: 682,012

[22] Filed: Jul. 16, 1996

Related U.S. Application Data

[63] Continuation of Ser. No. 636,279, Dec. 31, 1990.

[30] Foreign Application Priority Data

Dec. 30, 1989 [JP] Japan .................. 1-344717

[51] Int. Cl.⁶ .................................................. G06F 11/00
[52] U.S. Cl. .................................................. 395/182.02
[58] Field of Search ........................... 395/182.02

[56] References Cited

PUBLICATIONS

*Computer Architecture and Organization*, Second Edition by John P. Hayes, McGraw–Hill, Inc. ©1988 pp. 664–666.
*Microprocessors and Progrmmed Logic*, Second Edition by Kenneth L. Short, Prentice–Hall, Inc. ©1987 pp. 529–534.

*Primary Examiner*—Vincent P. Canney
*Attorney, Agent, or Firm*—Antonelli, Terry, Stout, & Kraus, LLP

[57] ABSTRACT

A plurality of different fault locating functions are provided in a communication system comprising a plurality of terminals connected to a data transmission channel. The functions are at different levels, respectively, ranging from a level for rapid fault location to a level for reliable and sure fault location. Upon detection of an occurrence of a fault, one fault locating function is performed. If the fault is not located accurately located, another fault locating function of a level for more reliable is performed, thus the functions are performed sequentially in the order from the level for rapid location to the level for more deliberate and reliable location. Preferably, the channel is reconfigured to avoid the fault, according to the fault located by the functions of the respective levels. With this arrangement, a fault which does most possibly occur can be located quickly, while another fault difficult to locate can be located accurately.

7 Claims, 4 Drawing Sheets

FIG. 5
PRIOR ART
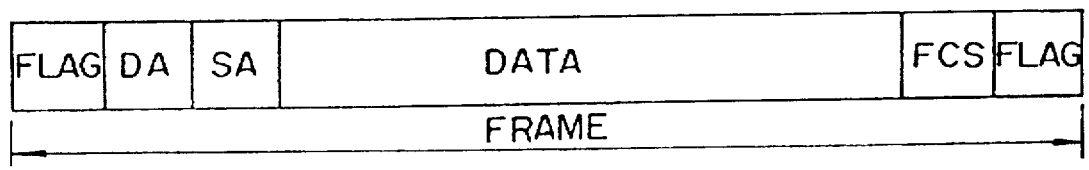
FIG. 6
POL : 0011111111111110
FIG. 7
RSV : 001111111111111000
FIG. 8
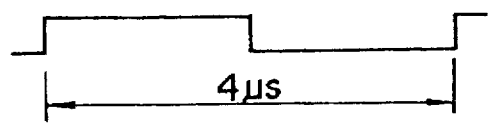
4μs

METHOD OF LOCATING FAULT OF COMMUNICATION SYSTEM

This application is a continuation of application Ser. No. 07/636,279, filed Dec. 31, 1990.

BACKGROUND OF THE INVENTION a. Field of the Invention

This invention relates to a method of locating a fault in a communication system, and more particularly to the technology concerning reconfiguration of a channel for avoiding a faulty station.

b. Description of the Related Art

FIG. 2 of the accompanying drawings shows a typical conventional communication system in which a duplex loop transmission of data is performed. In FIG. 2, two channels 16, 17 are such that their respective directions of transmission are opposite to both other. In each of the channels 16, 17, at least one control station (hereinafter called "CST") 10 and other stations (hereinafter called "ST") 11, 12, 13, 14, 15 are disposed.

The CST 10 is a station which controls data transmission. STs 11, 12, 13, 14, 15 perform transmission of data. In the case a fault, such as power cut-off, occurs in the ST 14, the fault is located and avoided in the following manner:

In FIG. 3, assuming that power cut-off occurs at the ST 14, no signal from the channel 16 enters the ST 15, and no signal from the channel 17 enters the ST 13. Subsequently STs 15, 13 detect the fault, and the content of the detected fault is notified to the CST 10. The CST 10 instructs the ST 15 to return the data of the channel 17 to the channel 16 and also instructs the ST 13 to return the data of the channel 16 to the channel 17. As a result, the channels are reconfigured as shown in FIG. 3 and can avoid the ST 14 where the fault is occurring.

According to the prior art, an ST adjacent to a faulty station detects the fact that a received signal is an abnormal signal, whereupon the channels are reconfigured. Since a fault is detected simply by the presence/absence of a signal, it is possible to detect a fault quickly and to reconfigure the channels quickly. However, when a fault occurs inside a station and particularly in a circuit for detecting an abnormal external signal, or in an LSI or the like for controlling transmission of data, such a fault cannot be located. In such an event, reconfiguration of channels to avoid the fault cannot be attained.

Thus, as to a fault occurring in a channel or another fault such as power cut-off in a station which may possibly occur in an ordinary operation, it is possible to reconfigure a channel suitably and quickly. To the contrary, regarding a fault occurring inside a station, it is not possible to locate the fault, and therefore, it is not possible to achieve a proper reconfiguration of channels to avoid the fault.

This prior technology of channel reconfiguration is exemplified by Japanese Patent Laid-Open Publication No. 175335/1983.

SUMMARY OF THE INVENTION

It is therefore a first object of this invention to provide a method of locating a fault in a communication system a method, which is capable of locating accurately not only faults which may be highly likely to occur in ordinary use but also other faults which are difficult to detect by conventional.

A second object of the invention is to provide a communication system which is capable of achieving accurate and quick reconfiguration of channels not only for faults which may be highly likely to occur in ordinary use but also for other faults which are difficult to detect.

According to the invention, there is provided a method of locating a fault in a communication system, comprising the steps of: providing a plurality of fault locating functions for searching and discriminating a fault in the communication system at a plurality of levels, ranging from a level for quicker discrimination to a level for more deliberate and reliable discrimination; and operating, when a fault is detected, the plurality of different fault locating functions one or more times successively, in the order of the levels such that the fault can be discriminated more quickly, until the fault is finally located.

By this method, not only a fault that is able to be located quickly but also other faults that are difficult to locate can be located accurately, without impeding the quick location of the fault that is able to be quickly detected. Further, in this method, the channels may preferably be reconfigured so as to avoid successive faults, according to the faults discriminated successively in order by the different fault detecting functions.

As a result, for a fault that is able to be detected quickly, the channels are reconfigured quickly to eliminate a potential cause of a fault, thereby enabling normal communication quickly. Likewise, for other faults that are difficult to detect, the channels are reconfigured accurately to enable normal communication.

The above and other advantages, features and additional objects of this invention will be manifest to those versed in the art upon making reference to the following detailed description and the accompanying drawings in which a preferred embodiment incorporating the principles of this invention is shown by way of illustrative example.

BRIEF DESCRIPTION OF THE DRAWINGS

FIG. 5 is a diagram showing a format of a transmission frame to be used in the communication system according to the present embodiment of the invention;

FIG. 6 is a diagram showing a bit pattern of a control signal "invitation" to be used for communication control in the communication system according to the present embodiment of the invention;

FIG. 7 is a diagram showing a bit pattern of a control signal "occupation" to be used for communication control in the communication system according to the present embodiment of the invention; and FIG. 8 is a diagram showing a waveform of a supervisory signal to be used for communication control in the communication system of the embodiment.

DETAILED DESCRIPTION OF PREFERRED EMBODIMENTS

Figure 2:
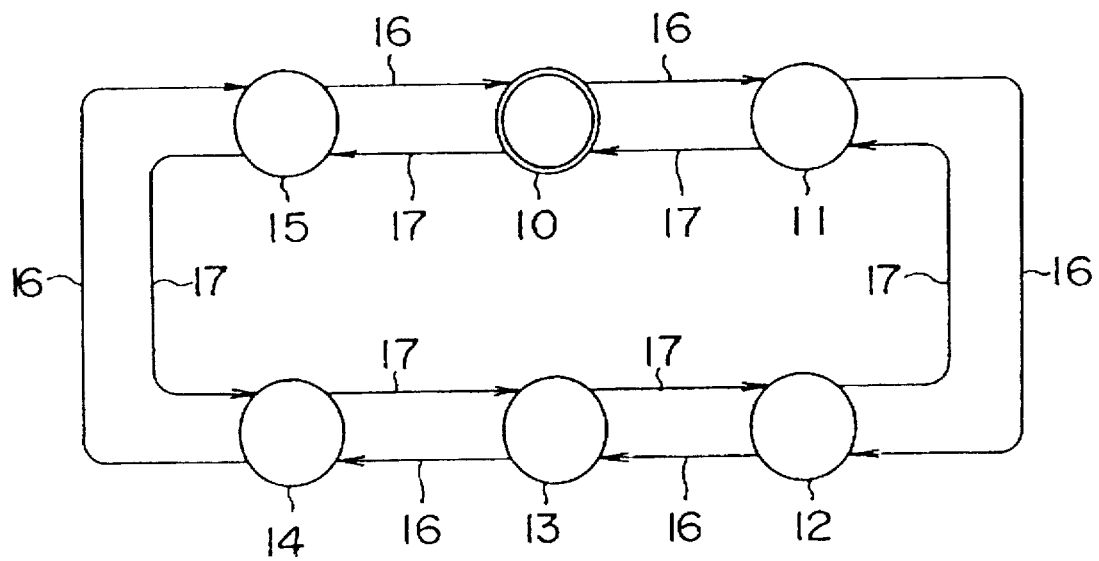
FIG. 2 shows a general construction of a prior art communication system using duplex loop transmission of data.
Figure 3:
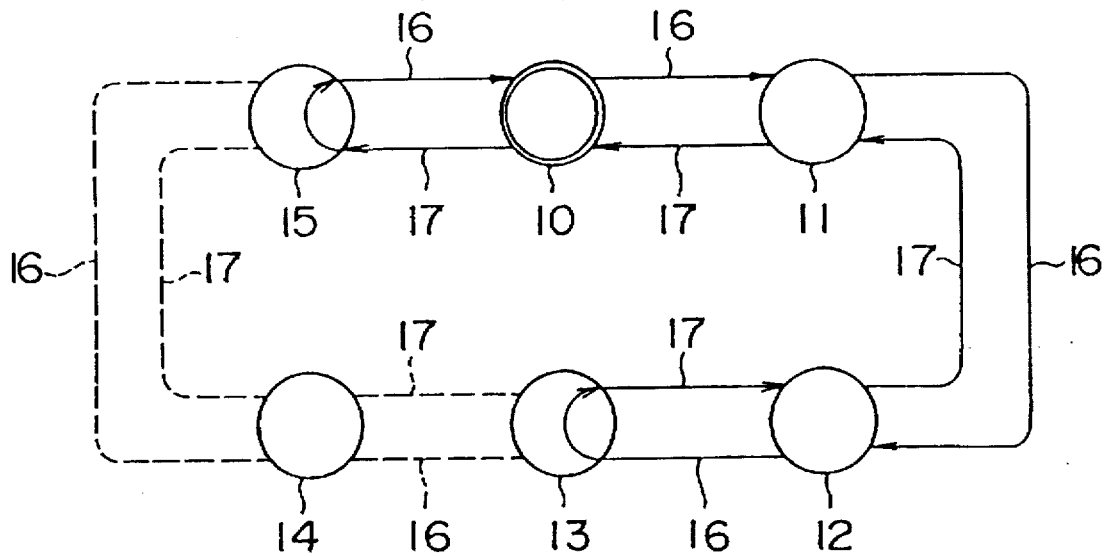
FIG. 3 shows the manner in which channels are reconfigured by loop back.

The principles of this invention are particularly useful when embodied in a communication system using duplex loop transmission of data. The general configuration of the communication system according to the present invention is similar to that of the prior art (FIG. 2) using a duplex loop channel, and so its description is omitted here.

Figure 4:
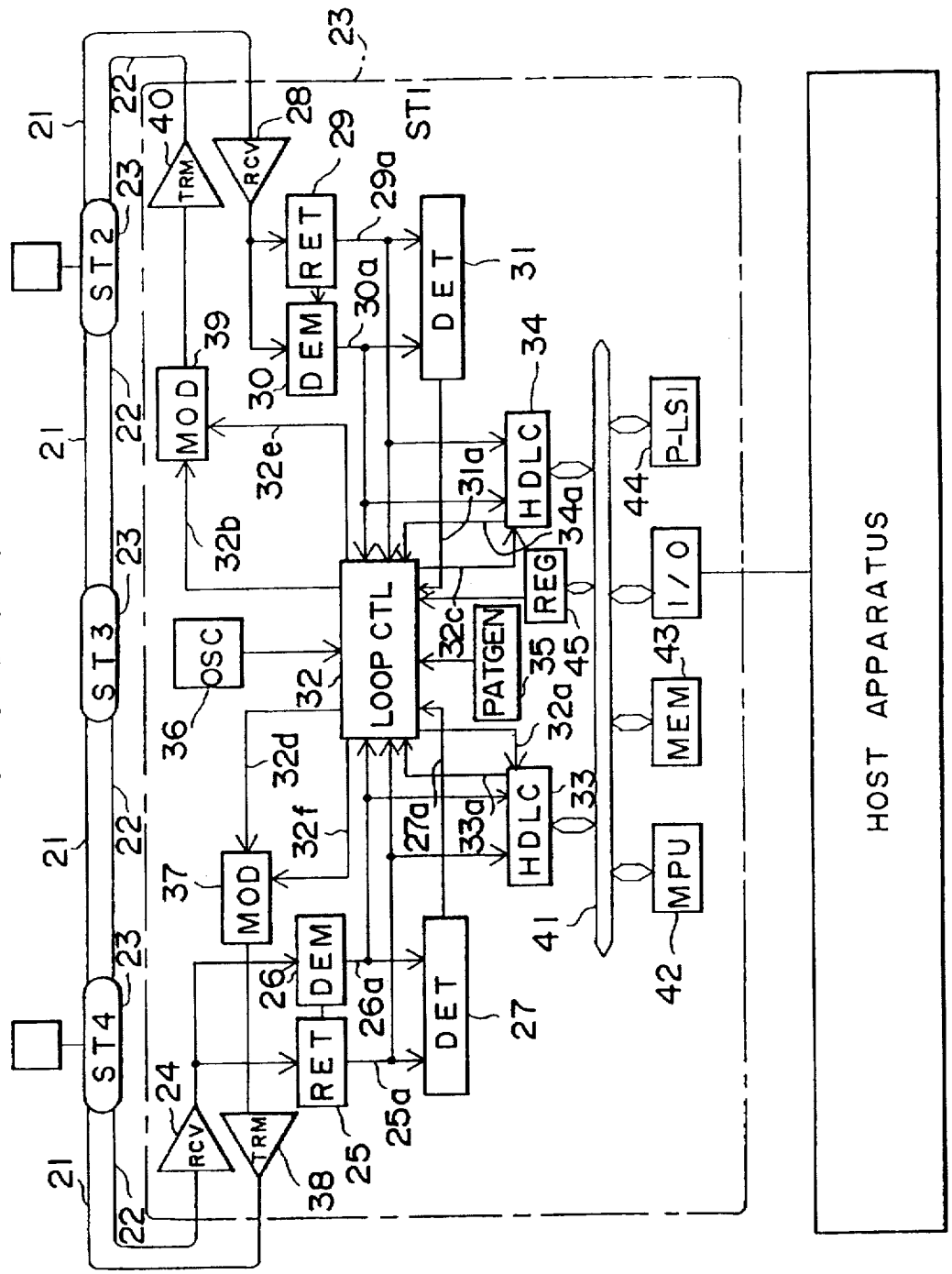
FIG. 4 is a block diagram showing the construction of various stations according to the present embodiment of the invention.

FIG. 4 shows a CST and STs according to one embodiment of the present invention. In this embodiment, the CST is selected from the plural STs as the need arises. Since the CST and STs have a common construction, the STs hereinafter represent the CSTs and STs in the description of an operation.

As shown in FIG. 4, STs 23 are connected in a loop by a pair of channels, 21 and 22, whose directions of transmission are opposite to each other, and a host apparatus such as a computer is connected to the STs.

In FIG. 4, a signal received by a receiving circuit RCV 24 of an ST1 is input to a receiving clock extracting circuit RET 25 and a demodulating circuit DEM 26. A timing signal 25a, extracted by the clock extracting circuit RET 25, is input to the demodulating circuit DEM 26 to demodulate the received data as a signal 26a, and the signal 26a along with the signal 25a is thereby input to a communication LSI-HDLC 33. The HDLC 33 is connected to a microcomputer bus 41, which is controlled by a microcomputer MPU 42, and performs, data processing along with a memory MEM 43 and other LSI-P-LSI 44 connected to the microcomputer bus 41.

The transmission from the ST 23 is transformed in the following manner.

Firstly, the HDLC 33 transfers transmission data 33a to a transmission control circuit LOOP CTL 32 in synchronism with a transmission timing clock 32a from the transmission control circuit LOOP CTL 32. The transmission timing clock is generated by an oscillator OSC 36.

Then, the transmission data in the form of a signal 32b from the LOOP CTL 32, along with a modulating clock 32e, are transmitted to a modulating circuit MOD 39. The modulating circuit MOD 39 modulates the transmission data and transmits the same to a transmission channel 22 via a transmitting circuit TRM 40. The foregoing is the flow of data in the case the channel 22 is used.

The flow of data in the case the channel 21 is used will now be described; the route in this case is substantially similar to that in the case of the channel 22 is used and is therefore described briefly.

The data received by a receiving circuit RCV 28 are input to a clock extracting circuit RET 29 and a demodulating circuit DEM 30 to cause a demodulated data signal 30a and an extracted timing signal 29a to be input to an LSI-HDLC 34. The HDLC 34 is connected to the microcomputer bus 41 so that processing of demodulated data is performed.

For transmission, the LOOP CTL 32 gives a timing signal as a transmission timing clock 32c, which is generated by the oscillator OSC 36, to the HDLC 34 to output a transmission data 34a. Then, a modulation clock 32f and a transmission data signal 32d are transmitted to a modulating circuit MOD 37, and upon modulation, they are transmitted from a transmitting circuit TRM 38. Subsequently, the flow of data, when the ST 23 inputs data from the channel 22 and transmits the data to the channel 21, namely, when the ST 23 becomes a loop back end station as so called in reconfiguration of channels, will now be described. The data input from the receiving circuit RCV 24 are input to the HDLC 33 along the same route and are thereby processed. For transmission, transmission data take a selected route passing the LOOP CTL 32, the MOD 37 and the TRM 38.

Inversely, the flow of data, when the ST 23 inputs data from the channel 21 and transmits the data to the channel 22, is as follows. The data input from the receiving circuit RCV 28 are input to the HDLC 34 and are thereby processed. For transmission, transmission data take a selected route passing the LOOP CTL 32, the MOD 39 and the TRM 40.

Each of the foregoing data transmission routes is controlled by the LOOP CTL 32, which has a function of identifying a received signal and then changing the transmission route. Specifically, a signal detector DET 27 monitors a signal from the channel 22, and upon receipt of the signal being monitored, the detector DET 27 gives a notice to the LOOP CTL 32. The LOOP CTL 32 identifies the noted signal and changes the transmission route. Also a signal detector DET 31 monitors a signal from the channel 21, and upon receipt of the signal being monitored, the detector DET 31 gives a notice to the LOOP CTL 32. The LOOP CTL 32 identifies the noted signal and changes the transmission route. A signal generator PAT GEN 35 operates in association with the detector DET 27 and the detector DET 31 and transmits a special signal to the channel 21 or 22.

FIG. 5 shows a frame format of transmission data in this communication system. In FIG. 5, FLAG designates a synchronizing flag for synchronizing communication LSI-HDLCs 33, 34; DA, a destination address; SA, a source address; DATA, a data portion; FCS, a frame check sequence; and the last FLAG, the end of a frame.

The main part of transmission procedure of each ST in this transmission system will now be described.

FIG. 6 shows a control signal indicating "invitation" of a transmission right; the ST which received this signal gets the transmission right.

FIG. 7 shows a control signal indicating "occupation" of a transmission right; when the ST which received the "invitation" control signal of FIG. 6 enters transmitting operation, it changes the received "invitation" signal to the "occupation" signal and transmits the latter to the STs downstream in the transmission loop. In this communication system, using these two control signals, the transmission right of each ST is adjusted to avoid any collision of transmissions.

This "invitation" signal is detected by the detectors DETs 27, 31; the operation to change the "invitation" signal to the "occupation" causes the LOOP CTL 32 to transmit a signal of the PAT GEN 35 in response to the notice from the detectors DET 27, 31.

The reconfiguration of channels in this communication system will now be described.

Each ST manages five states: (1) reception of the "invitation" control signal; (2) reception of the "occupation" control signal; (3) reception of a frame used for data transmission; (4) reception of a repeating signal of low frequency (a period of 4 µs in this embodiment) of "1" and "0" called a supervisory signal and shown in FIG. 8; and (5) reception of no signal.

The management of the supervisory-signal-state and the no-signal-state is performed by detecting the output of the DEM 26 or 30 by the LOOP CTL.

Assuming that the prior art is applied to this communication system, each ST would monitor, for example, the five states on the opposite sides of the channels 21, 22 and perform high-speed reconfiguration at a hardware logic circuit level of the LOOP CTL 32. Namely, if the channels 21, 22 are normal, data transmission is performed along either of the channels, with the monitoring signal flowing along the other channel as a standby channel.

Further, in the loop back state, data transmission is performed by using both channels 21, 22. Namely, during transmitting data, the DETs 27, 31 receive the data frame, the "invitation" control signal, the "occupation" control signal or the monitoring signal.

In the case in which no signal was received, namely, the state of no signal, a fault occurs in a channel to input data to the ST or in an ST located upstream of the channel. Therefore, when the detectors 27, 31 of an ST detect no signal state, the ST starts reconfiguring the channel.

However, when the detectors DET 27, 31 of the ST receives the data frame, the "invitation" control signal, the "occupation" control signal or a monitoring signal, they determine that the fault recovered and are returned to their normal operation. The ST performs quick reconfiguration of channel by hardware logic control of the LOOP CTL 32, depending on the presence and absence of signals of the channels 21, 22. When the ST enters reconfiguration of channels, the LOOP CTL 32 is prevented from shifting its operation from detecting the "invitation" control signal to transmitting the "occupation" control signal.

With the foregoing arrangement, for example, assuming that in the ST 23, the HDLC 33 has a failure in the mode of outputting a transmission request, when the "invitation" control signal is detected by the detector DET 27, the LOOP CTL 32 causes the PAT GEN 35 to output the "occupation signal" to a downstream ST. But, transmission is not performed due to the failure of the HDLC 33, so that the "occupation" state of the channels of this ST is not released permanently. Therefore, not only the ST in which the HDLC 33 is failed, but also every ST of the communication system will become disabled to transmit data.

Thus, according to the prior art, if a fault occurs inside the ST, the desired reconfiguration of channels to avoid the fault is possibly not performed correctly.

With a view to obviate this problem encountered by the prior art, this embodiment contemplates transmitting the frame from the CST to the channels after reconfigurating the channels by the hardware logic circuit level. CST must be selected from the STs prior to this operation. In the ST, the data transmitted by the CST are processed by the HDLC 33 or 34 and are transferred to the microcomputer MPU 42 (FIG. 4).

After confirming that the transmitted frame is a correct frame (FIG. 5), that no error occurs in the frame and that the content of data is appropriate, the microcomputer MPU 42 controls a register REG 45 and releases the LOOP CTL 32 to shift its operation from detecting the "invitation" control signal to transmitting the "occupation" control signal.

Further, regarding a frame transmitted by the CST, the remaining STs sequentially confirm, in the order connected to the loop channel, that the format of the frame is proper, that no error occurs in the frame and that the content of data is appropriate. If it is found to be normal, the remaining STs return a responding frame to the CST.

The CST performs a round check for confirming whether a normal response is returned from every ST connected to the loop channel, and the CST finalizes reconfiguration of channel. If the round check is not finalized normally, it starts locating a fault of a mode b described below.

Figure 1:
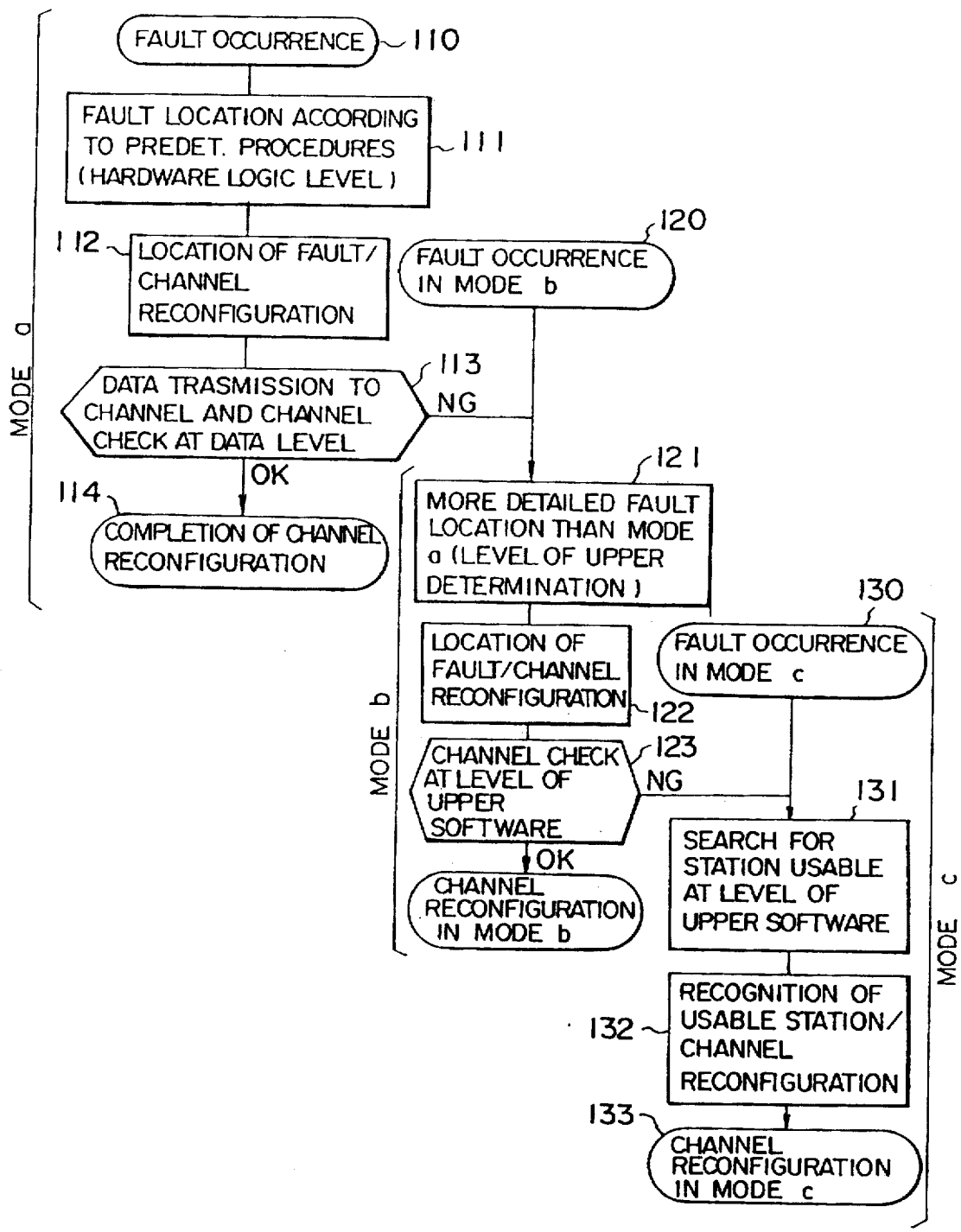
FIG. 1 is a flow diagram showing an algorithm of reconfiguration of channels of a communication system embodying the present invention.

FIG. 1 shows a basic algorithm of the entire operation of the reconfiguration of channels according to this embodiment of the present invention As shown in FIG. 1, firstly, each ST controls five states, i.e. (1) reception of the frame used for data transmission, (2) reception of the "invitation" control signal, (3) reception of the "occupation" control signal, (4) reception of a monitoring signal and (5) reception of no signal, to perform quick reconfiguration of channels at a hardware logic circuit level (Steps 111 and 112). Then, by the frame transmitted from the CST, each ST makes a data check, and the SCT makes a round data check, thereby confirming whether or not the communication system is normal (Step 113). This level is defined here as mode a.

In the mode a, the CST makes a round check for confirming whether a normal response is returned from every ST connected to the lo,op channel; if normal, the CST finalizes the reconfiguration of channels. If the round check does not terminate normally, the CST starts locating a fault by using the frame (the start of the mode b).

The process of reconfiguration of channel in the mode b will now be described with reference to FIG. 1.

In the mode b. either CST or ST makes an instruction and a response by a frame. In the frame, it checks the frame format, the error occurrence and the content of data to make a judgment as to whether or not it is normal.

Firstly the CST, to an adjacent ST, an instruction for causing the latter to become a loop back end station by a frame. The adjacent ST, which has received the frame, returns a response frame to the CST to become a loop back end station, thereby forming a loop back construction only by the CST and the adjacent ST.

Now, the CST makes a round check similar to that at the final stage of the mode a; if normal, the CST then transmits, to an ST next to an adjacent ST an instruction for causing the former ST, to become a loop back end station by a frame. The ST next to the adjacent ST, which has received the frame, returns a response frame to the CST to become a loop back end station.

Then the CST makes a round check again; if it is normal, the CST then causes the third ST to an adjacent ST to expand the loop back in the same procedure (Step 121).

When it finds a fault during the foregoing process, the CST can separate the fault and then, instruct the ST to make a loop back formation again so that the number of STs may be maximal, thereby forming a channel (Step 122).

The procedure for reconfiguring of channel now terminate, or a more reliable check is made (Step 123).

This highly reliable check utilizes a communication protocol between softwares by the software of, for example, a computer connected to the station to check the health of the communication system by confirming a response such as "ACK" or "NACK" to an instruction given. The level up to the confirmation that the communication system is normal is defined as the mode b.

If the reconfiguration of channels does not succeed, it starts searching a normal ST by software of, for example, a computer connected to the station (the start of mode c).

The process of reconfiguring channels in the mode c will now be described.

The mode c requires a response message by accessing, by software such as of a computer connected to the CST, a computer connected to each of the remaining STs. A computer whose response message is requested returns, by using its own communication software, to a computer connected to the CST. A computer connected to the CST causes each ST to repeat its operation, checks whether or not communication at the level of software of a computer is normal, and determines its condition. Now if not normal, a computer connected to the CST instructs the CST to reconfigure the channels by collecting only the ST connected with the computer whose communication is normal, thus reconfiguring the channels. This level is defined as the mode c.

Although this is the end of the reconfiguration of channels in the present embodiment, checking the reconfiguration of channels done in the mode c and reconfiguring an upper (more reliable) channel may be repeated in order.

Further, in this embodiment, the CST is selected from the STs as desired. In a special alternative system, one or more stations STs may be fixed as CSTs.

As mentioned above, according to this embodiment, regarding a fault, such as power cut-off of an station, in which an abnormal signal from outside the station can be detected, quick reconfiguration of channels can be achieved; regarding a fault inside the station, in which an abnormal signal cannot be detected, reliable reconfiguration of channels can be attained.

Thus, the reconfiguration of channels is determined in any of the modes a, b and c. Each ST stores the mode in which the reconfiguration of channel is determined and it restarts an algorithm of the reconfiguration of channel from the level of the stored mode when a fault occurs again, thereby preventing unnecessary "hunting" for reconfiguration of channels.

However, after a faulty station has been dismantled or removed, it is desirable to start the reconfiguration of channels from the mode a.

Although the principles of this invention are applied to a communication system using duplex loop data transmission similar to that of the prior art, this invention can also be applied to an ordinary communication system and a single loop communication system having a public network for back-up. The STs in this embodiment may be replaced with an ordinary transmission control unit or a communication unit, with the same result.

Further, in this embodiment, the channels are reconfigured. But this invention can be applied also to location of a fault or other procedures to be done by locating the fault. In the latter case, the procedures (Steps 112, 122 and 132) of reconfiguration of channel in FIG. 1 may be replaced by the procedures to which the invention is applied and channel checking (Steps 113 and 123) may be replaced by checking of a fault to be detected by the procedures. For mere location of a fault, the procedures for channel-reconfiguration may be omitted.

According to this invention, it is possible to provide a method of locating a fault in a communication system, by which not only a fault highly likely to occur in an ordinary use quickly but also other faults difficult to detect can be located accurately.

Further, it is possible to provide a communication system which is capable of achieving an accurate reconfiguration of channels not only for a fault highly likely to occur in an ordinary use quickly but also for other faults difficult to detect.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A communication system comprising:

a data transmission channel means for transmission of frames comprising a loop data transmission channel;

a plurality of stations connected to said data transmission channel;

at least one control station connected to said data transmission channel;

a plurality of channel reconfiguring means, including a first level channel reconfiguring means and a second level channel reconfiguring means, for detecting, locating and eliminating a fault in said communication system by determining transmission normality at each of said stations via said data transmission channel, determining a location of said fault in said communication system and eliminating said fault from said communication system by reconfiguring said data transmission channel according to the location of said fault, wherein said first level channel reconfiguring means for detecting, locating and eliminating said fault is adapted to perform said fault detecting, locating and eliminating functions at a level for a rapid determination, to thereby reconfigure said communication system, and said second level channel reconfiguring means, comprising said control station, which includes reconfiguration controlling means for executing processes for reconfiguring said data transmission channel, transmitting a confirmation signal to said reconfigured data transmission channel, and determining whether or not transmission via said reconfigured data transmission channel is normal or not according to a response signal to said transmit confirmation signal, performs said fault detecting, locating and eliminating functions repeatedly at a more deliberate and reliable level than said first level channel reconfiguring means until a determination has been made that said fault has been located and said data transmission channel has been reconfigured; and control means for controlling, upon detection and of said fault, said channel reconfiguring means to perform said fault locating and eliminating functions from said level for a rapid determination of said first level channel reconfiguring means to said level for a more deliberate and reliable determination of said second level channel reconfiguring means, until said fault has been eliminated and said communication system has been reconfigured.

2. A communication system according to claim 1, wherein said control station and said stations are each connected to respective host apparatuses and said plurality of channel reconfiguring means comprises a third-level channel reconfiguring means;

said third-level channel reconfiguring means comprising said host apparatuses;

each of said host apparatuses comprising:

third level determination means for transmitting confirmation signals to others of said host apparatuses and for locating said fault from the status of responses to said confirmation signals, after completion of all of said reconfiguration control means of said second level channel instructing means;

third level channel reconfiguration instructing means for instructing said host apparatus or apparatuses associated with said fault located by said third level determination means to reconfigure the transmission channel to avoid the located fault;

third level response means for responding to said confirmation signals from said third level determination means of other of said host apparatuses; and third-level configuration-change-instructing means for instructing a change of said transmission channel in response to the instruction from said third-level reconfiguration instructing means to said control station or the station to which said host apparatus is connected.

3. A communication system according to claim 1, which further comprises a plurality of transmission control apparatuses, each of said transmission control means including a first level channel reconfiguring means formed of hardware logic circuits for locating said fault by a rapid determination method and reconfiguring said channel to avoid said fault.

4. A communication system, comprising:

a loop data transmission channel for transmitting frames;

a plurality of stations connected to said loop data transmission channel;

at least one control station connected to said loop data transmission channel; and a plurality of host apparatuses connected to said plurality of stations and said control station;

wherein each of said stations and said control station comprises:

means for detecting lack of a reception signal received from said loop data transmission channel, and first reconfiguration means for estimating a fault location according to a position where said reception signal is lacking and reconfiguring said loop data transmission channel so as to avoid said fault location, and wherein said control station further comprises:

means for transmitting a confirmation frame to said loop data transmission channel after said loop data transmission channel has been reconfigured by said first reconfiguration means, determining means for determining whether or not said fault location has been eliminated based on a response frame in response to said confirmation frame, and second reconfiguration means for giving the stations instructions to reconfigure the loop data transmission channel which has been reconfigured by said first reconfiguration means, when said determining means has determined that said fault location has not yet been eliminated, wherein said second reconfiguration means transmits a confirmation frame to the reconfigured loop data transmission channel and determining whether or not a normal response frame of each of said stations is present in response to said confirmation frame to determine whether said fault location has been eliminated, and provides instructions to the stations to reconfigure the loop data transmission channel until the fault location is eliminated when it is determined that the fault location has not yet been eliminated, and wherein each of said plurality of stations further comprise:

means for confirming the normality of said confirmation frame received from said loop data transmission channel, means for transmitting the response frame in response to said confirmation frame to said loop data transmission channel when said received confirmation frame is normal, and means for changing said loop data transmission channel configuration according to the reconfiguration instructions from said second reconfiguration means, received via said loop data transmission channel, wherein said host apparatuses connected to said control station comprises:

means for determining whether or not the fault location has been eliminated by exchanging messages between said host apparatuses by using frames after the configuration of said loop data transmission channel has been changed in accordance with the reconfiguration instructions from said second reconfiguration means, and third reconfiguration means for exchanging messages between the host apparatuses by using frames to determine the fault location and providing the reconfiguring instructions to the other host apparatuses so as to reconfigure the loop data transmission channel to avoid the detected fault location when it is determined that said fault location has not yet been eliminated.

5. A communication system according to claim 4, wherein said at least one control station is selected from said plurality of stations connected to said loop data transmission channel.

6. A communication system according to claim 4, further comprising control means for controlling, upon detection of said fault, said control station to perform said fault locating and eliminating functions from said level for a rapid determination of said first reconfiguring means to said level for a more deliberate and reliable determination of said second reconfiguring means, until said fault has been eliminated and said communication system has been reconfigured.

7. A communication system according to claim 5, wherein said control means starts, upon detection of occurrence of another fault after the previous fault has been eliminated by said second level channel reconfiguring, the performance of the channel reconfiguring means from said second level channel reconfiguring means, at least one time for each means, sequentially in the order of levels for rapid determination to more deliberate and reliable determination, until said another fault has been eliminated; and said control means further starts, upon detection of occurrence of another fault after the previous fault has been eliminated by the third level channel reconfiguring means, the performance of said channel reconfiguring means from said third level channel reconfiguring means, at least once for each means, sequentially in the order of levels for rapid determination to more deliberate and reliable determination, until said another fault has been located.

* * * * *